United States Patent
Kobayashi et al.

(10) Patent No.: US 6,792,215 B1
(45) Date of Patent: Sep. 14, 2004

(54) MULTIWAVELENGTH LIGHT SOURCE DEVICE EMPLOYING ANNULAR OPTICAL DELAY CIRCUIT

(75) Inventors: Isao Kobayashi, Atsugi (JP); Koji Kawakita, Atsugi (JP); Hiroshi Furukawa, Sagamihara (JP); Shigeru Kinugawa, Tokyo (JP)

(73) Assignee: Anritsu Corporation, Tokyo (JP)

( * ) Notice: Subject to any disclaimer, the term of this patent is extended or adjusted under 35 U.S.C. 154(b) by 1018 days.

(21) Appl. No.: 09/856,518

(22) PCT Filed: Sep. 28, 2000

(86) PCT No.: PCT/JP00/06725
§ 371 (c)(1),
(2), (4) Date: May 21, 2001

(87) PCT Pub. No.: WO01/24412
PCT Pub. Date: Apr. 5, 2001

(30) Foreign Application Priority Data
Sep. 30, 1999 (JP) .......................... 11-279881

(51) Int. Cl.$^7$ .................. H04J 14/00; H04J 14/08; H04B 10/04
(52) U.S. Cl. .................. 398/161; 398/53; 398/102; 398/183; 398/186
(58) Field of Search ........................ 398/186, 161, 398/102, 53, 183

(56) References Cited

U.S. PATENT DOCUMENTS

| | | | |
|---|---|---|---|
| 4,794,598 A | * | 12/1988 | Desurvire et al. ............. 372/3 |
| 5,691,832 A | * | 11/1997 | Liedenbaum et al. ......... 398/43 |
| 5,953,142 A | * | 9/1999 | Chiaroni et al. .............. 398/82 |

FOREIGN PATENT DOCUMENTS

| | | |
|---|---|---|
| JP | 61-184997 A | 8/1986 |
| JP | 62-240939 | 10/1987 |
| JP | 3-230103 | 10/1991 |
| JP | 8-62051 | 3/1996 |
| JP | 10-93164 | 4/1998 |
| JP | 10-145391 A | 5/1998 |
| JP | 11-168431 | 6/1999 |

OTHER PUBLICATIONS

Ishii et al; Quasi–Continuous Wavelength Tuning in Super–Structure–Grating (SSG) DBR Lasers; Feb. 1995; pp. 19–24; "Technical Report of the Institute of Electronics Information and Communication Engineers of Japan" (IEICE) ; OPE 94–111.

ITO et al; "Foundation and Application of Semiconductor Laser" published by Baifukan, p. 192–301; Tokyo, 1989.

* cited by examiner

*Primary Examiner*—M. R. Sedighian
(74) *Attorney, Agent, or Firm*—Frishauf, Holtz, Goodman & Chick, P.C.

(57) ABSTRACT

A multi-wavelength light source apparatus includes a tunable light source, optical intensity modulator, optical coupler, annular optical delay circuit, and optical gate device. The tunable light source successively changes and outputs a plurality of output lights different in wavelength from one another. The optical intensity modulator outputs a modulated signal light obtained by modulating an amplitude of the output light outputted from the tunable light source over a predetermined time. The optical coupler is optically connected to the optical intensity modulator, and receives the light outputted from the optical intensity modulator. The annular optical delay circuit is optically connected to the optical coupler, and delays a part of the output light outputted from the optical intensity modulator over a time longer than the predetermined time. The optical gate device is optically connected to the optical coupler, receives the output light outputted from the optical intensity modulator and the light passed via the annular optical delay circuit to open a gate at a timing and time width such that all of the signal light modulated over the predetermined time is included one by one for each of the plurality of wavelengths.

11 Claims, 9 Drawing Sheets

MULTIWAVELENGTH LIGHT SOURCE DEVICE EMPLOYING ANNULAR OPTICAL DELAY CIRCUIT

This application is a U.S. National Phase Application under 35 USC 371 of International Application PCT/JP00/06725 (not published in English) filed Sep. 28, 2000.

TECHNICAL FIELD

The present invention relates to a multi-wavelength light source apparatus, particularly to a multi-wavelength light source apparatus which outputs a digital signal light with digital information superimposed thereon and in which an annular optical delay circuit is used and makes wavelength-multiplexed packets comprising digital signal lights independent of one another simultaneously output.

BACKGROUND ART

At present, in a field of data communication, a network mainly comprising an exchange which is "expensive" but which has guaranteed high "reliability" has been a mainstream.

In near future, however, a plan for not using such exchange, and shifting to a "low-cost" next-generation data communication network utilizing an Internet apparatus has being moved forward.

In the next-generation data communication network, an Internet technique is employed to divide all information such as voice represented by telephone and dynamic image into information groups called packets to be superimposed onto a digital signal on, and the information is efficiently transmitted (by enhancing use efficiency of the circuit).

Moreover, a simple data repeater called a router constitutes a core of the next-generated data communication network.

Additionally, the existing router mainly handles an electric packet signal.

In near future, however, to increase a transmission capacity, an optical router for directly inputting/outputting an optical packet signal wavelength-division-multiplexed (WDM) is considered to be a mainstream.

Similarly as the electric router, the optical router requires a routing function of recognizing an address included in the packet and transferring the packet to a designated address.

In general, software and processor for controlling the routing function is mounted on the router.

In the optical router for handling wavelength-division-multiplexed signals, since a signal processing is complicated, it is supposedly necessary to check and confirm whether or not the software normally operates beforehand.

Therefore, in order to easily check the operation of the optical router, it is essential to employ a multi-wavelength light source apparatus which can transmit the multi-wavelength packets to be superimposed pseudo signals on.

Figure 22:
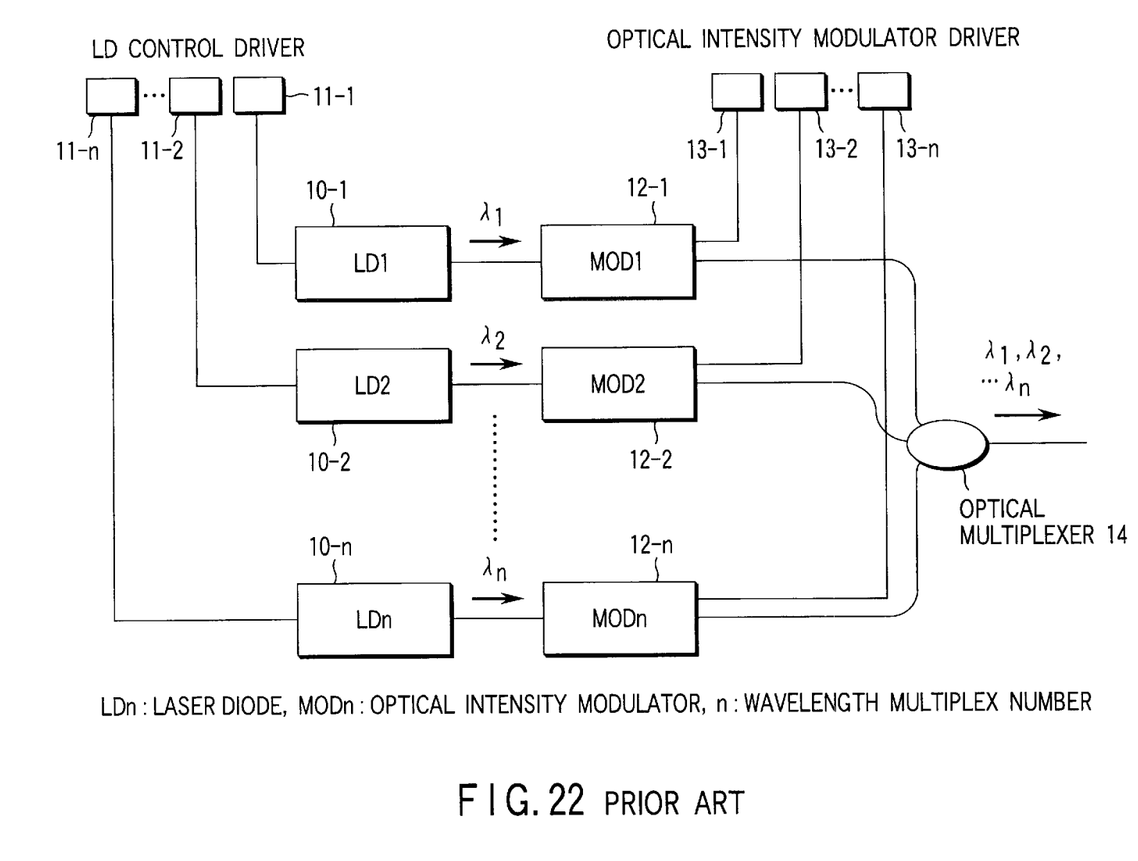
FIG. 22 is a block diagram showing a constitution of a conventional multi-wavelength light source apparatus.

FIG. 22 shows a constitution of a conventional representative multi-wavelength light source apparatus.

The conventional multi-wavelength light source apparatus shown in FIG. 22 includes n semiconductor laser diodes (LDs) having a single oscillation frequency 10-1, 10-2, ..., 10-n, for example, when a wavelength multiplex number is n.

Here, each of the LD 10-1, 10-2, ..., 10-n is able to generate each light having a frequency (e.g., an interval of 100 GHz on the basis of 193.1 THz) defined by International Telecommunication Union (ITU).

Moreover, the multi-wavelength light source apparatus includes: n LD control drivers 11-1, 11-2, ..., 11-n for controlling oscillation states of the respective LDs 10-1, 10-2, ..., 10-n; n optical intensity modulators 12-1, 12-2, ..., 12-n for superimposing digital signals independent of one another on lights (wavelengths $\lambda 1, \lambda 2, \ldots, \lambda n$) outputted from the respective LDs 10-1, 10-2, ..., 10-n and outputting the lights; n optical intensity modulator drivers 13-1, 13-2, ..., 13-n for driving the respective optical intensity modulators 12-1, 12-2, ..., 12-n; and an optical coupler 14 for combining and multiplexing all output lights from the respective optical intensity modulators 12-1, 12-2, ..., 12-n.

Additionally, in the next-generation data communication network, it is expected that the transmission capacity is 1 terabit/second or more from now on. Therefore, there is high possibility that the wavelength multiplex number of the multi-wavelength light source apparatus becomes 100 or more.

Accordingly, for the conventional multi-wavelength light source apparatus, 100 or more sets of LD 10, LD control driver 11, optical intensity modulator 12, and optical intensity modulator driver 13 becomes necessary.

Therefore, in the conventional multi-wavelength light source apparatus, there are problems that the apparatus is enlarged in size and that cost becomes very high.

DISCLOSURE OF INVENTION

An object of the present invention is to provide a small-sized and inexpensive multi-wavelength light source apparatus consisting of an annular optical delay circuit which makes possible to easily keep up with an increase of a wavelength multiplex number in order to perform shipping inspection of an optical router expected to constitute a core of the next-generation network and inspection during construction of the network.

To achieve the aforementioned object, according to a first aspect of the present invention, there is provided a multi-wavelength light source apparatus comprising:

a tunable light source (1) for successively changing and outputting a plurality of output lights different in wavelength from one another;

an optical intensity modulator (2) for outputting a modulated signal lights obtained by modulating an amplitude of the output light outputted from the tunable light source over a predetermined time;

an optical coupler (3), optically connected to the optical intensity modulator, for receiving the output light from the optical intensity modulator;

an annular optical delay circuit (4), optically connected to the optical coupler, for delaying a part of the output light from the optical intensity modulator over a time longer than the predetermined time; and an optical gate device (5), optically connected to the optical coupler, for receiving the output light from the optical intensity modulator and the light passed via the annular optical delay circuit to open a gate at a timing and a time width such that all of the signal lights modulated over the predetermined time are included one by one for each of the plurality of wavelengths.

Moreover, according to a second aspect of the present invention, there is provided the multi-wavelength light source apparatus of the first aspect, comprising an optical amplifier (6), optically connected into the annular optical delay circuit (4), for amplifying a light intensity of the light inputted to the annular optical delay circuit.

Furthermore, according to a third aspect of the present invention, there is provided the multi-wavelength light source apparatus of the second aspect, comprising an optical frequency filter (7), optically connected into the annular optical delay circuit (4), for passing only the plurality of lights different in wavelength from one another outputted by the tunable light source.

Additionally, according to a fourth aspect of the present invention, there is provided the multi-wavelength light source apparatus of the first aspect, comprising an optical digital device (8), optically connected into the annular optical delay circuit (4) and provided with characteristics such that light transmittance is high when the intensity of the light inputted to the annular optical delay circuit exceeds a predetermined threshold value, and the light transmittance is low when the light intensity indicates the threshold value or less.

Moreover, according to a fifth aspect of the present invention, there is provided the multi-wavelength light source apparatus of the second aspect wherein the optical amplifier (6) is an optical bistable device for selectively amplifying only the plurality of lights different in wavelength from one another outputted by the tunable light source and amplifying an alternating-current component of the modulated signal light at an amplification factor higher than that of a direct-current component.

Furthermore, according to a sixth aspect of the present invention, there is provided the multi-wavelength light source apparatus of the first aspect, comprising: an optical amplifier (6), optically connected into the annular optical delay circuit (4), for amplifying a light intensity of the light inputted to the annular optical delay circuit; and an optical digital device (8), optically connected into the annular optical delay circuit (4) and provided with characteristics such that light transmittance is high when the intensity of the light inputted to the annular optical delay circuit exceeds a predetermined threshold value, and the light transmittance is low when the light intensity indicates the threshold value or less.

Additionally, according to a seventh aspect of the present invention, there is provided the multi-wavelength light source apparatus of the third aspect wherein the optical frequency filter (7) is an asymmetric Mach-Zehnder interferometer.

Moreover, according to an eighth aspect of the present invention, there is provided the multi-wavelength light source apparatus of the third aspect wherein the optical frequency filter (7) is a Fabry-Perot resonator.

Furthermore, according to a ninth aspect of the present invention, there is provided the multi-wavelength light source apparatus of the first aspect, comprising:
- a tunable light source driver (101) for driving the tunable light source (1) in a predetermined state;
- an optical intensity modulator driver (201) for driving the optical intensity modulator (2) in the predetermined state; and
- an optical gate device driver (501) for driving the optical gate device (5) in the predetermined state.

Additionally, according to a tenth aspect of the present invention, there is provided the multi-wavelength light source apparatus of the ninth aspect, comprising a controller (100) for controlling the tunable light source driver (101), the optical intensity modulator driver (201), and the optical gate device driver (501) in the respective predetermined states.

Moreover, according to an eleventh aspect of the present invention, there is provided the multi-wavelength light source apparatus of the third aspect, comprising an optical digital device (8), optically connected into the annular optical delay circuit (4) and provided with characteristics such that light transmittance is high when the intensity of the light inputted to the annular optical delay circuit exceeds a predetermined threshold value, and the light transmittance is low when the light intensity indicates the threshold value or less.

BEST MODE FOR CARRYING OUT OF THE INVENTION

Respective embodiments of a multi-wavelength light source apparatus according to the present invention will be described hereinafter with reference to the drawings.

(First Embodiment)

Figure 1:
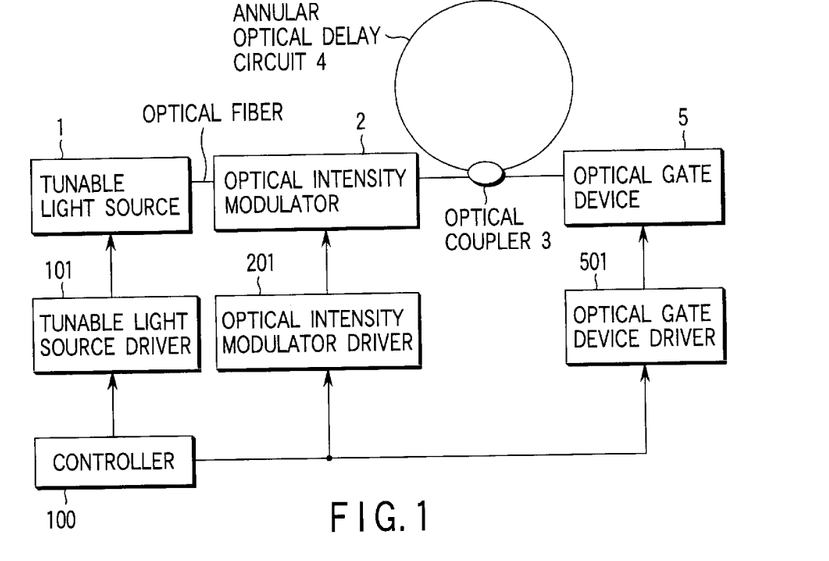
FIG. 1 is a block diagram showing a constitution of a first embodiment of a multi-wavelength light source apparatus according to the present invention.

FIG. 1 is a block diagram showing a constitution of a first embodiment of the multi-wavelength light source apparatus according to the present invention.

That is, the multi-wavelength light source apparatus according to the first embodiment includes: a tunable light source 1 for successively changing and outputting a plurality of output lights different in wavelength from one another; an optical intensity modulator 2 for outputting the output light outputted from the tunable light source 1 as a modulated signal light amplitude-modulated over a predetermined time; an optical multiplexer 3, optically connected to the optical intensity modulator, for receiving the output light from the optical intensity modulator; an annular optical delay circuit 4, optically connected to the optical coupler 3, for delaying a part of the output light from the optical intensity modulator 2 over a time longer than the predetermined time; and an optical gate device 5, optically connected to the optical coupler 3, for receiving the output light from the optical intensity modulator 2 and the light passed via the annular optical delay circuit 4 to open a gate at a timing and a time width such that all of the modulated signal light over the predetermined time is included one by one for each of the plurality of wavelengths.

Additionally, the annular optical delay circuit 4 may be annular, if the light can be transmitted around so as to delay the light inputted to the annular optical delay circuit 4 over the time longer than the predetermined time as described above, and a shape of the circuit is not limited to a circular shape shown in FIG. 1.

Moreover, the multi-wavelength light source apparatus of this embodiment includes: a tunable light source driver 101 for driving the tunable light source 1 in a predetermined state as described later; an optical intensity modulator driver 201 for driving the optical intensity modulator 2 in a predetermined state as described later; an optical gate device driver 501 for driving the optical gate device 5 in a predetermined state as described later; and a controller 100 for controlling the tunable light source driver 101, the optical intensity modulator driver 201, and the optical gate device driver 501 in a predetermined state as described later.

That is, in the multi-wavelength light source apparatus according to the first embodiment, the tunable light source 1, optical intensity modulator 2, optical coupler 3, and optical gate device 5 are disposed in this order and optically interconnected to one another.

Furthermore, the optical coupler 3 is optically connected to the annular optical delay circuit 4. A part of the signal light outputted from the optical intensity modulator 2, for example, ½ of the signal light in a case in which a 3 dB coupler is used as the optical coupler 3 is delayed by a predetermined time as described later.

Additionally, in the first embodiment, an optical fiber is used as one example of means for optically connecting the aforementioned components to one another.

An operation of the multi-wavelength light source apparatus according to the first embodiment will be described hereinafter in detail.

First, the controller 100 and tunable light source driver 101 set the wavelength of the light outputted from the tunable light source 1 to λ1, drive the tunable light source 1, and allow the tunable light source 1 to output the light with a wavelength of λ1.

Figure 2:
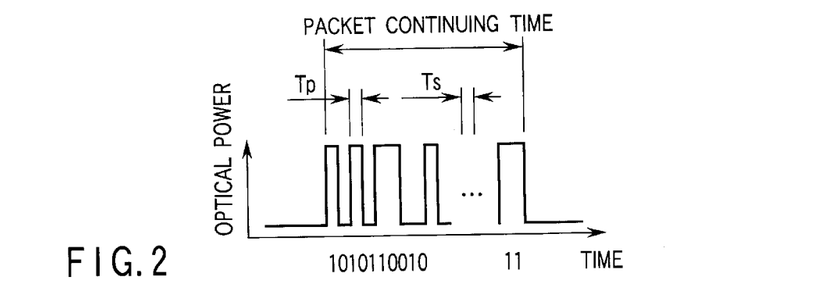
FIG. 2 is a diagram showing a concept of a packet applied to the present invention.

Subsequently, the light with the wavelength of λ1 outputted from the tunable light source 1 is modulated in amplitude by the optical intensity modulator 2 controlled/driven by the controller 100 and optical intensity modulator driver 201, and converted to a digital signal light represented by "1", "0" as shown in FIG. 2.

Additionally, a digital signal shown in FIG. 2 is represented using a non-return to zero (NRZ) code.

A modulated signal light (digital signal light) shown in FIG. 2 is usually called a packet.

For example, when a packet length is set to 4096 bytes, and signal transmission speed is set to 2.5 gigabit/second, a packet continuing time (corresponding to a time for subjecting the output light from the tunable light source 1 to amplitude modulation in the optical intensity modulator 2, and denoting the predetermined time in the first embodiment of the present invention) is about 13.1 μs.

Subsequently, after the packet outputted from the optical intensity modulator 2 is branched into two by the optical coupler 3, one packet is inputted to the annular optical delay circuit 4, and the other is inputted to the optical gate device 5.

Here, a timing for generating the packet can be set to an arbitrary timing by controlling the operation of the optical intensity modulator 2 by the controller 100 and optical intensity modulator driver 201.

Furthermore, an optical delay time in the annular optical delay circuit 4 (time required for the packet to turn around once in the annular optical delay circuit 4) needs to be set to be longer than the packet continuing time (about 13.1 μs in the aforementioned example).

For example, when the optical fiber is used to constitute the annular optical delay circuit 4, to set the light delay time in the annular optical delay circuit 4 to 15 to 50 μs, a length of the optical fiber needs to be of the order of 3 to 10 km such that a core refractive index is 1.5.

Figure 3:
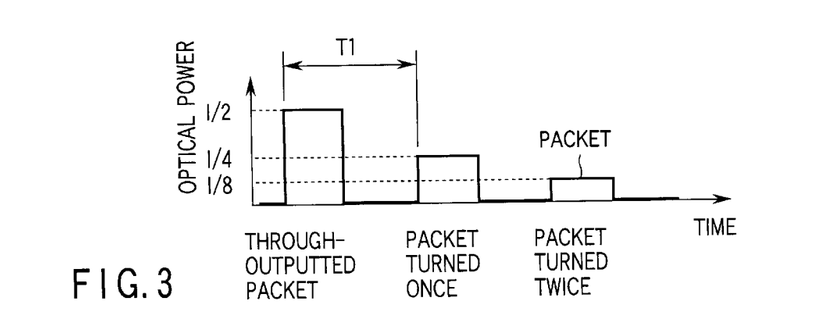
FIG. 3 is a diagram showing a concept of a packet string outputted to an optical gate device from an optical coupler of FIG. 1.

FIG. 3 shows a packet string outputted to an optical gate device 5 side from the optical coupler 3.

That is, as shown in FIG. 3, the packet is outputted every time T1 required for the light inputted to the annular optical delay circuit 4 to turn around once in the annular optical delay circuit 4.

The packet having turned around once in the annular optical delay circuit 4 in this manner is more frequent in transmission through the optical coupler 3 by once than the packet which has not passed via the annular optical delay circuit 4 (through-outputted packet shown in FIG. 3), and a light intensity therefore becomes ½.

Subsequently, after the light with the wavelength of λ1 subjected to the amplitude modulation over the predetermined time by the optical intensity modulator 2 is guided to the optical coupler 3 in this manner, the controller 100 and tunable light source driver 101 change the wavelength of the light outputted from the tunable light source 1 to λ2 from λ1, and allow the tunable light source 1 to output the light with the wavelength of λ2.

Similarly as the wavelength of λ1, the light with the wavelength of λ2 outputted from the tunable light source 1 is subjected to the amplitude modulation over the predetermined time by the optical intensity modulator 2 controlled/driven by the controller 100 and optical intensity modulator driver 201, and the packet is thereby prepared.

The digital signal in the packet can be set to be different from that in the aforementioned packet with the wavelength of λ1.

Moreover, a timing at which the packet with the wavelength of λ2 is generated and inputted to the annular optical delay circuit 4 is synchronized with a timing of the packet with the wavelength λ1 turned once in the annular optical delay circuit 4, or slightly deviates from the timing.

Similarly, when the packets possessing independent digital signal lights with wavelengths of λ3, λ4, . . . , λn are inputted to the annular optical delay circuit 4, the wavelength-division-multiplexing is performed.

Figure 4:
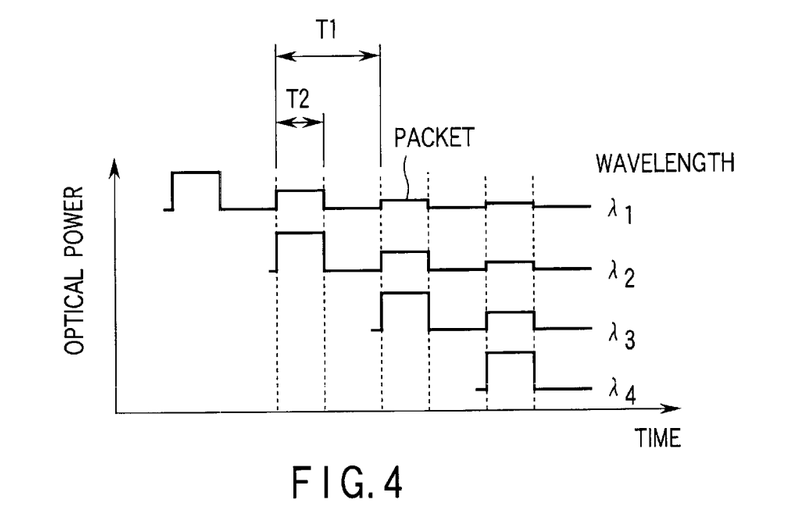
FIG. 4 is a diagram showing a concept of the packet string outputted to the optical gate device from the optical coupler of FIG. 1 when a wavelength multiplex number is 4.

FIG. 4 shows the packet string outputted to the optical gate device 5 from the optical coupler 3 when the wavelength-division-multiplexing is performed in this manner.

FIG. 4 shows an example in which four packet has been wavelength-division-multiplexed, and the respective wavelength packets are synchronized with one another.

Additionally, used as the tunable light source 1 is a distributed Bragg reflector (DBR) laser using a Super-Structure-Grating (SSG) having characteristics of a tuning range of 100 nm or more (e.g., "Quasi-Continuous Wavelength Tuning in Super-Structure-Grating (SSG) DBR Lasers" by Ishii, Tanobe, Kondo, Yoshikuni, Kano, Tomori, "Technical Report of the Institute of Electronics Information and Communication Engineers of Japan (IEICE)" OPE 94–111, pp. 19 to 24, February, 1995).

Here, the SSG-DBR laser is a laser in which DBR regions are disposed on front and rear sides to hold an active region therebetween.

Moreover, the DBR region of the SSG-DBR laser has a structure (called Super-Structure-Grating) in which a diffraction grating is periodically repeated so as to change a pitch in some place, and an oscillation wavelength is variable in a range of 100 nm or more.

That is, with the SSG-DBR laser for use as the tunable light source 1, a time required for setting the wavelength is about several tens of nanoseconds. Therefore, when a difference (T1−T2) between time T1 necessary for turning the packet once in the annular optical delay circuit 4 and packet continuing time T2 is set to several tens of nanoseconds or more, it is possible to multiplex the packets with the wavelengths of λ1, λ2, λ3, λ4 at the timing as shown in FIG. 4.

Moreover, as the optical gate devices, for example, a semiconductor laser amplifier, acousto-optic modulator described later in a ninth embodiment, and the like are used.

The semiconductor laser amplifier has a function of amplifying an input light when power supply turns on, and absorbing (extinguishing) the input light when the power supply turns off.

Furthermore, an extinction ratio of the semiconductor laser amplifier is 40 to 45 dB, and a time for switching on/off the power supply (rise/fall time) is about 10 ns.

Figure 5:
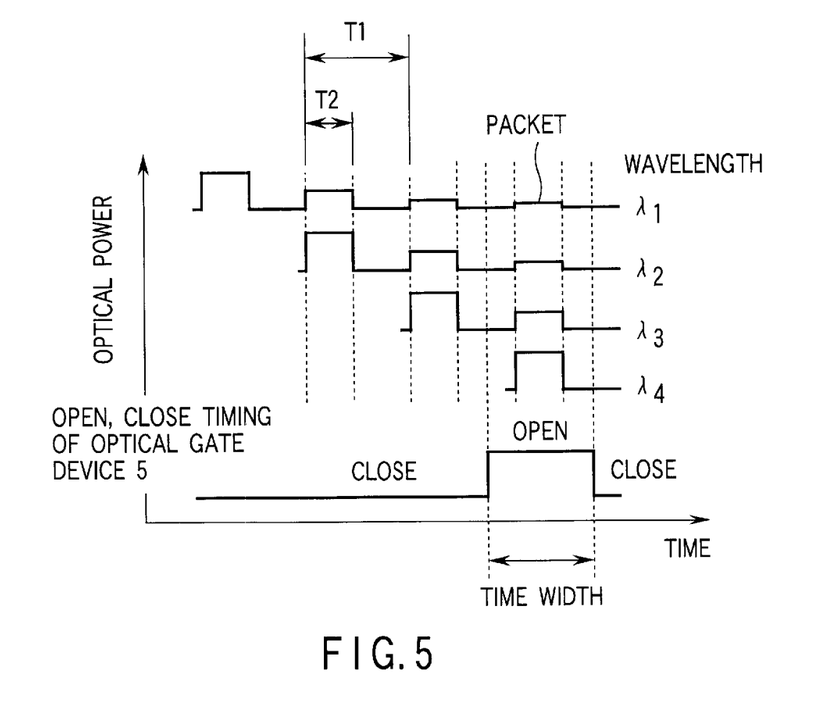
FIG. 5 is a diagram showing a concept of a drive timing and time width of the optical gate device of FIG. 1 in order to output wavelength-division-multiplexed packets one by one for each wavelength.

Therefore, in order to simultaneously output the wavelength-division-multiplexed packets consisting of independent digital signal lights from the optical gate device 5, driving may be controlled in such a manner that the controller 100 and optical gate device driver 501 open a gate of the optical gate device 5 (a gate open state is represented by OPEN, and a gate closed state is represented by CLOSE) at a timing and time width shown in FIG. 5.

As described above, according to the first embodiment, the multi-wavelength light source apparatus can be realized in which wavelength-division-multiplexed packets formed of the digital signal lights independent of one another can simultaneously be outputted from the optical gate device 5.

(Second Embodiment)

Additionally, in the constitution of the aforementioned first embodiment, the digital signal light passes the optical coupler 3 once every time the light turns around once in the annular optical delay circuit 4.

Therefore, it is assumed that the packet light intensity is set to I immediately before the packet outputted from the optical intensity modulator 2 is inputted to the optical coupler 3, and the 3 dB coupler is used as the optical coupler 3. After the light turns around N times in the annular optical delay circuit 4, the light intensity of the packet outputted to the optical gate device 5 side is represented by the following:

$$I \times (½)^{N+1}.$$

Since the packet light intensity is attenuated by 3 dB for each turn of the packet in the annular optical delay circuit 4 in this manner, the light intensity of the digital signal light in the packet is lowered, and this gradually deteriorates a S/N ratio.

Figure 6:
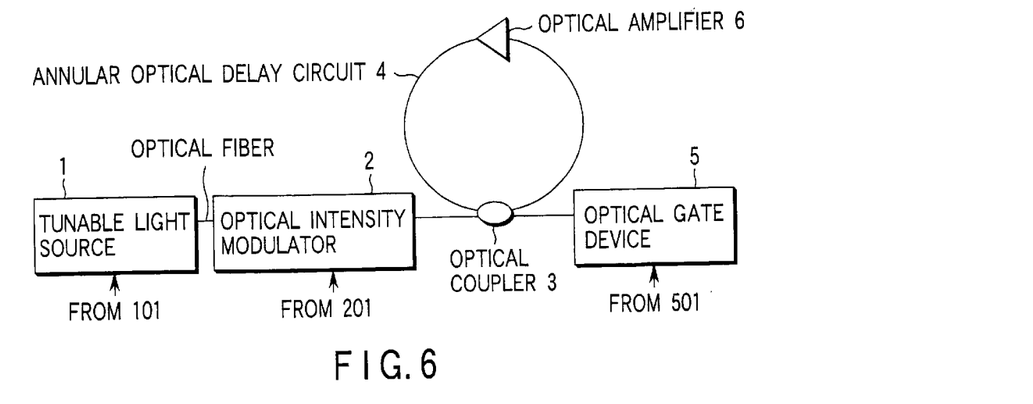
FIG. 6 is a block diagram showing a constitution of a second embodiment of the multi-wavelength light source apparatus according to the present invention.

In the second embodiment, as means for solving this problem, the optical amplifier 6 is disposed in the annular optical delay circuit 4 to prevent the light intensity of the signal light turning in the annular optical delay circuit 4 from being lowered by 3 dB for each turn.

FIG. 6 is a block diagram showing a constitution of the second embodiment of the multi-wavelength light source apparatus according to the present invention.

As shown in FIG. 6, the multi-wavelength light source apparatus of the second embodiment is similar to that of the first embodiment, except that the optical amplifier 6 is disposed in the annular optical delay circuit 4.

That is, as described above, the signal light turning in the annular optical delay circuit 4 reaches the optical coupler 3, and the half of the signal light enters the optical gate device 5, and a light amplification factor in the optical amplifier 6 is then adjusted in such a manner that the same light intensity as that of the previously inputted light is obtained.

Thereby, the light intensity of the signal light can be equalized among the packets different in wavelength from one another.

Since other respects are similar to those of the first embodiment, description thereof is omitted.

(Third Embodiment)

Additionally, in the optical amplifier 6 used in the second embodiment, an Amplified Spontaneous Emission (ASE) noise light is generated.

Since the ASE caused in the optical amplifier 6 is accumulated in the annular optical delay circuit 4, for the packet having a large number of turns, the S/N ratio of the digital signal light is deteriorated because of the accumulated ASE.

Figure 7:
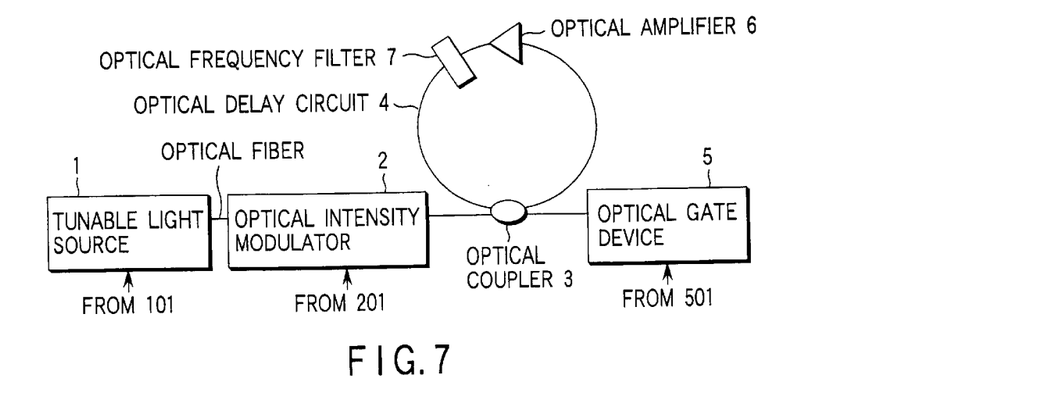
FIG. 7 is a block diagram showing a constitution of a third embodiment of the multi-wavelength light source apparatus according to the present invention.

Therefore, in a third embodiment, as means for solving this problem, an optical frequency filter 7 is disposed together with the optical amplifier 6 in the annular optical delay circuit 4.

Here, the optical frequency filter is a filter for passing only a light having a packet optical frequency (the optical frequency of the digital signal light defined by ITU).

Since the optical frequency filter 7 is disposed together with the optical amplifier 6 in the annular optical delay circuit 4 so as to remove a frequency component other than the packet optical frequency in the ASE, the S/N ratio of the digital signal in the packet having a large number of turns can be prevented from being deteriorated because of the ASE accumulated in the annular optical delay circuit 4.

FIG. 7 is a block diagram showing a constitution of the third embodiment of the multi-wavelength light source apparatus according to the present invention.

That is, the multi-wavelength light source apparatus of the third embodiment is similar to that of the second embodiment, except that the optical frequency filter 7 is disposed together with the optical amplifier 6 in the annular optical delay circuit 4 as shown in FIG. 7.

That is, the multi-wavelength light source apparatus of the third embodiment is similar to that of the second embodiment except that the optical frequency filter 7 is disposed, the description thereof is therefore omitted, and the optical frequency filter 7 will briefly be described.

Examples of the optical frequency filter 7 include a Fabry-Perot resonator, Mach-Zehnder interferometer, and the like.

Here, the Fabry-Perot resonator is constituted of two mirrors disposed opposite to each other at a distance Lz along the propagation direction of a light (Z direction).

Moreover, only a light with a frequency of νz represented by the following condition for forming a standing wave when the light reciprocates in the Z direction is outputted from the Fabry-Perot resonator:

$$\nu z=(c \cdot Nz)/(2n \cdot Lz)$$

Here, c denotes a light speed ($3 \times 10^8$ m/s), Nz denotes a degree of a longitudinal mode of a resonator, and n denotes a refractive index of a medium in the resonator.

Figure 8:
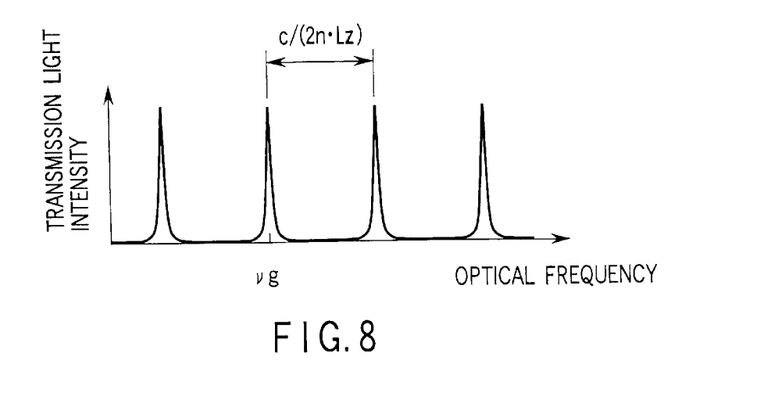
FIG. 8 is a diagram showing a concept of a transmission light spectrum of Fabry-Perot resonator for use as an optical frequency filter of FIG. 7.

When a value of Nz changes by +1 from the aforementioned conditions, a change amount of νz is represented as follows:

$$\Delta \nu z = c/(2n \cdot Lz),$$

and a spectrum of the light outputted from the Fabry-Perot resonator is therefore as shown in FIG. 8.

Additionally, as shown in FIG. 8, an interval Δνz between optical frequencies at which the transmission light intensity is maximized is usually called a Free Spectral Range (FSR).

Moreover, the resonance frequency νz in the Fabry-Perot resonator used as the optical frequency filter 7 is set to a frequency defined according to ITU recommendation.

Thereby, the component other than the signal light frequency component in the ASE amplified for each turn is removed, and it is possible to improve the S/N ratio of the digital signal light constituting the packet.

For example, when the multiplexed optical frequency interval is set to 100 GHz, that is, when Δνz is set to 100 GHz, and the medium in the Fabry-Perot resonator is air (n=1), Lz may be set to 1.5 mm.

Figure 9:
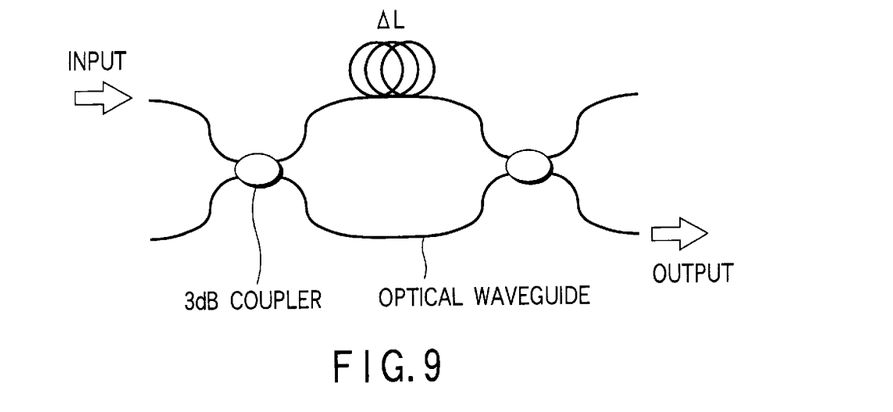
FIG. 9 is a diagram showing a constitution of an asymmetric Mach-Zehnder interferometer for use as the optical frequency filter of FIG. 7.

Moreover, the Mach-Zehnder interferometer able to be applied to the optical frequency filter 7 in the third embodiment is an asymmetric Mach-Zehnder interferometer constituted by two 3 dB couplers and two optical waveguides different in length from each other as shown in FIG. 9.

Figure 10:
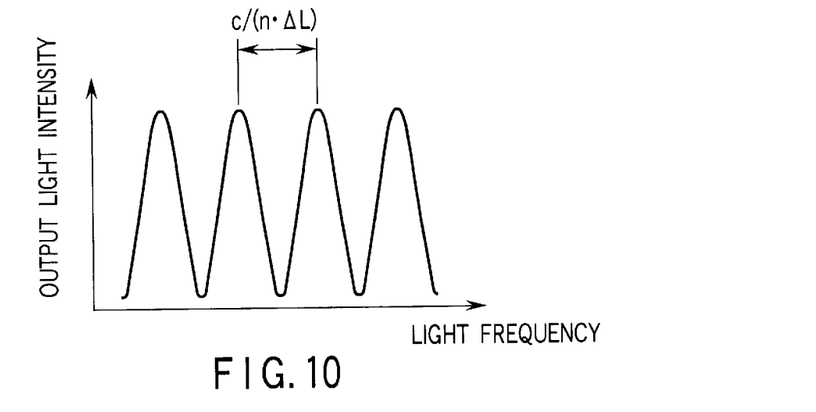
FIG. 10 is a diagram showing a concept of the transmission light spectrum of the asymmetric Mach-Zehnder interferometer of FIG. 9.

The optical spectrum outputted from the asymmetric Mach-Zehnder interferometer is shown in FIG. 10.

Furthermore, also when the asymmetric Mach-Zehnder interferometer is applied as the optical frequency filter 7, similarly when the Fabry-Perot resonator aforementioned is applied, the component other than the signal light frequency component in the ASE amplified for each turn is removed, and it is possible to improve the S/N ratio of the digital signal light constituting the packet.

Additionally, when it is assumed that c denotes the light speed ($3 \times 10^8$ m/s), n denotes the refractive index of the optical waveguide, and ΔL denotes a physical length difference between two optical waveguides, a free spectral range is represented as follows:

$$FSR=c/(n \cdot \Delta L).$$

For example, when the frequency interval of the multiplexed light is set to 100 GHz, and the refractive index n of the optical waveguide is 1.5, ΔL may be set to 2 mm.

(Fourth Embodiment)

Additionally, as means for removing the ASE accumulated in the annular optical delay circuit 4 and preventing the S/N ratio of the digital signal light constituting the packet from being deteriorated, in addition to the optical frequency filter 7 disposed in the annular optical delay circuit 4 as described above, the following means may be used.

Figure 11:
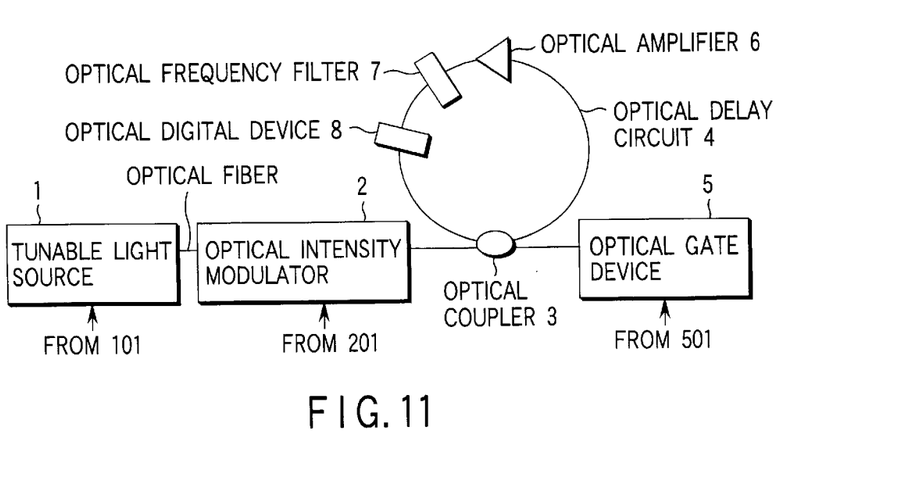
FIG. 11 is a block diagram showing a constitution of a fourth embodiment of the multi-wavelength light source apparatus according to the present invention.

That is, an optical digital device 8 applied as a fourth embodiment is disposed together with the optical amplifier 6 and optical frequency filter 7 in the annular optical delay circuit 4.

Here, the optical digital device is a device provided with characteristics such that light transmittance is high when the intensity of the inputted signal light exceeds a desired threshold value, and the light transmittance is low when the light intensity indicates the threshold value or less.

That is, the optical frequency filter inhibits the ASE of the frequencies to be removed. On the other hand, the optical digital device has a function of inhibiting the light (ASE, and the like) which is judged not to be the signal light and which has the light intensity of the threshold value or less.

FIG. 11 is a block diagram showing a constitution of a fourth embodiment of the multi-wavelength light source apparatus according to the present invention.

As shown in FIG. 11, the multi-wavelength light source apparatus of the fourth embodiment is similar to that of the third embodiment, except that the optical digital device 8 is disposed together with the optical amplifier 6 and optical frequency filter 7 in the annular optical delay circuit 4.

That is, the multi-wavelength light source apparatus of the fourth embodiment is similar to that of the third embodiment except that the optical digital device 8 is disposed, description thereof is omitted, and the optical digital device 8 will briefly be described.

As one example of the optical digital device 8, a saturable absorber is used.

Figure 12:
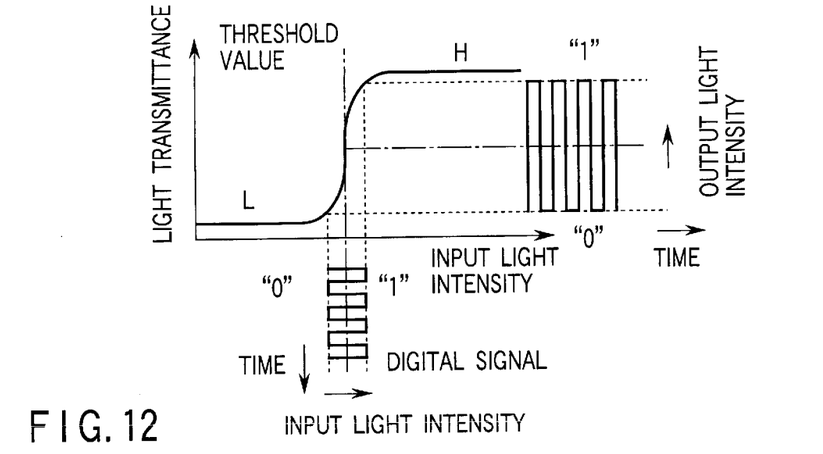
FIG. 12 is a diagram showing a concept of light transmittance with respect to an input light intensity in a saturable absorber for use as an optical digital device of FIG. 11.

FIG. 12 shows an example of a relation of light transmittance with respect to an input light intensity in the saturable absorber.

As shown in FIG. 12, when the inputted signal light is at "1" level, the light transmittance of the saturable absorber reaches a high (H) level. When the signal is at "0" level, the light transmittance of the saturable absorber is at a low (L) level.

A direct-current level of the light inputted to the saturable absorber is set to an input light intensity (indicating the threshold value) whose light transmittance rapidly rises in the relation between the input light intensity and the light transmittance. It is then possible to regenerate the digital signal light.

Furthermore, when the inputted signal light level is "1" level, the light transmittance of the saturable absorber reaches H level at the frequency of the inputted signal light, and the ASE having a frequency equal to that of the input signal light is therefore transmitted.

Additionally, when the inputted signal light level is "0" level, the light transmittance of the saturable absorber reaches L level at the frequency of the inputted signal light, and the ASE having a frequency equal to that of the input signal light is therefore absorbed.

Therefore, according to the fourth embodiment, since the optical digital device 8, such as the saturable absorber, is disposed in the annular optical delay circuit 4, it is possible to inhibit the S/N ratio of the digital signal light in the annular optical delay circuit 4 from being deteriorated.

(Fifth Embodiment)

Additionally, according to the second embodiment, since the optical amplifier 6 is disposed in the annular optical delay circuit 4, the light intensity of the packet outputted to the optical gate device 5 can be inhibited from fluctuating.

However, in this case, the ASE noise outputted from the optical amplifier 6 is accumulated in the annular optical delay circuit 4, and the S/N ratio of the digital signal light is gradually deteriorated.

Then, in the third embodiment, in order to inhibit the S/N ratio of the digital signal light from being deteriorated, a technique of disposing the light frequency filter 7 for transmitting only the packet light frequency in the annular optical delay circuit 4 is employed.

Moreover, in the fourth embodiment, in order to inhibit the S/N ratio of the digital signal light from being deteriorated, a technique for disposing the optical digital device 8 which can regenerate the digital signal light and which absorbs the ASE having the frequency equal to that of the input signal light at the "0" level in the annular optical delay circuit 4 is employed.

Additionally, besides these techniques, there is a technique for employing a device provided with respective optical functions of the optical amplifier 6, optical frequency filter 7 and optical digital device 8.

Figure 13:
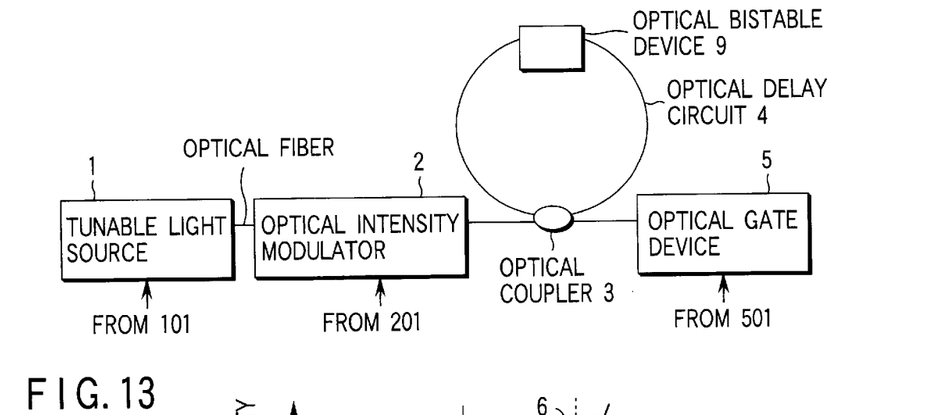
FIG. 13 is a block diagram showing a constitution of a fifth embodiment of the multi-wavelength light source apparatus according to the present invention.

That is, in the technique, an optical bistable device applied as a fifth embodiment is disposed in the annular optical delay circuit 4.

FIG. 13 is a block diagram showing a constitution of the fifth embodiment of the present invention in which the optical amplifier 6 in the second embodiment is replaced with an optical bistable device 9.

The fifth embodiment is similar to the second embodiment except that the optical amplifier 6 is replaced with the optical bistable device 9, description thereof is omitted, and the optical bistable device 9 will be described.

As one example of the optical bistable device 9, a resonant laser amplifier is used.

Characteristics of the resonant laser amplifier described later are described in "Foundation and Application of Semiconductor Laser" authored by Ryoichi Ito, and Michiharu Nakamura, published by Baifukan, pp. 192 to 201, Tokyo, 1989.

That is, the resonant laser amplifier is a Fabry-Perot resonator having an optical gain, and lights arranged at equal frequency interval generated by multiplex reflection in the amplifier are amplified at a high amplification factor.

In the resonant laser amplifier, when the input light level is increased to some degree or more, a density of a carrier contributing to stimulated emission is decreased by gain saturation, and the refractive index in an active layer is raised via anomalous dispersion effect and free carrier plasma effect.

Figure 14:
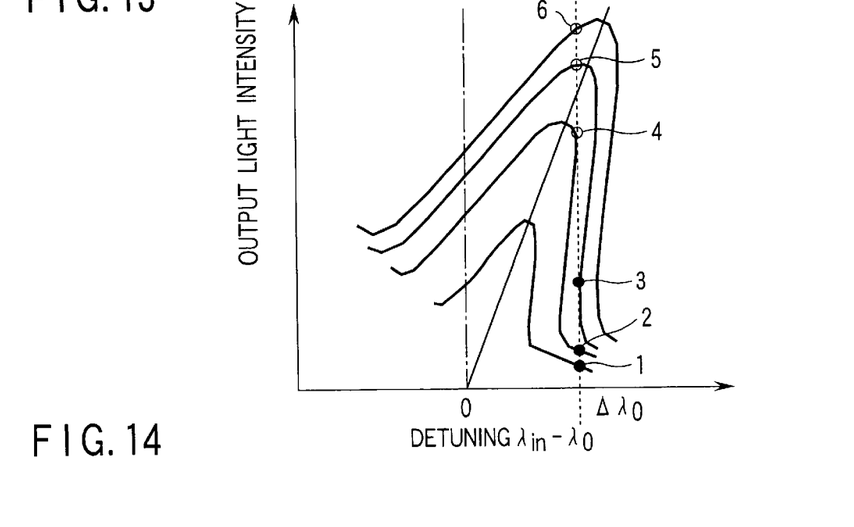
FIG. 14 is a diagram showing a concept of asymmetry of resonance characteristics in a resonant laser amplifier for use as an optical bistable device of FIG. 13.

When it is assumed that an input light wavelength is $\lambda in$, resonance wavelength dependent on a resonator length of the resonant laser amplifier is $\lambda 0$, effective refractive index of a resonant mode in the active layer is $ng$, a change amount of the refractive index of the active layer caused by gain saturation is $\Delta n$, and optical confinement function is $\Gamma$, resonance conditions are represented by:

$$\lambda in = (1 + \Gamma(\Delta n/ng)) 19\ \lambda 0,$$

and the resonance characteristics are shown in FIG. 14.

Asymmetry of the resonance characteristics shown in FIG. 14 becomes remarkable when the input light intensity increases.

Figure 15:
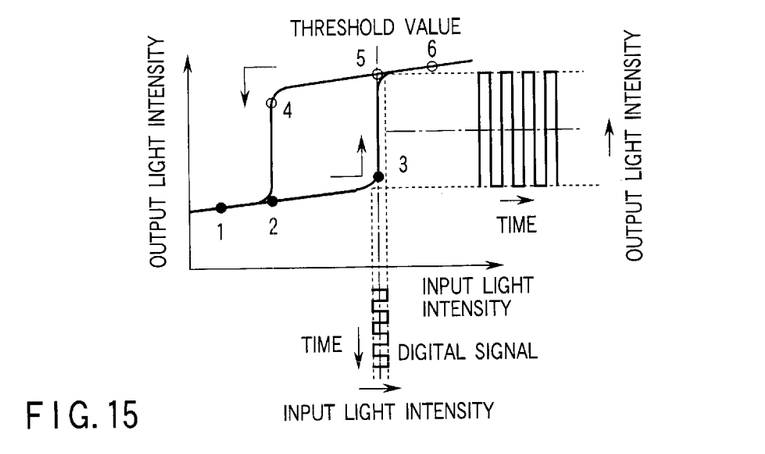
FIG. 15 is a diagram showing a concept of optical bistability in the resonant laser amplifier for use as the optical bistable device of FIG. 13.

When the input light wavelength $\lambda in$ is fixed to $\lambda 0 + \Delta \lambda 0$, and the input light intensity is changed, hysteresis is caused in input/output power, and optical bistability is realized as shown in FIG. 15.

Therefore, according to the fifth embodiment, similarly as the aforementioned saturable absorber, the direct-current level of the light inputted to the optical bistable device 9 is selected as the light intensity (indicating the threshold value) at which the output light intensity rapidly rises in an input/output relation. Then, it is possible to optically amplify an alternating-current component of the input signal light at an amplification factor higher than that of the direct-current component, and it is also possible to improve the S/N ratio of the digital signal light.

Furthermore, for the outputted ASE noise, as a result of multiplex reflection in the resonator, the frequency components other than the resonance frequencies are removed, and the ASE having the frequency equal to that of the input signal light in the "0" level is absorbed.

(Sixth Embodiment)

Additionally, in the fourth embodiment, the optical amplifier 6, optical frequency filter 7, and optical digital device 8 are disposed in the annular optical delay circuit 4.

Figure 16:
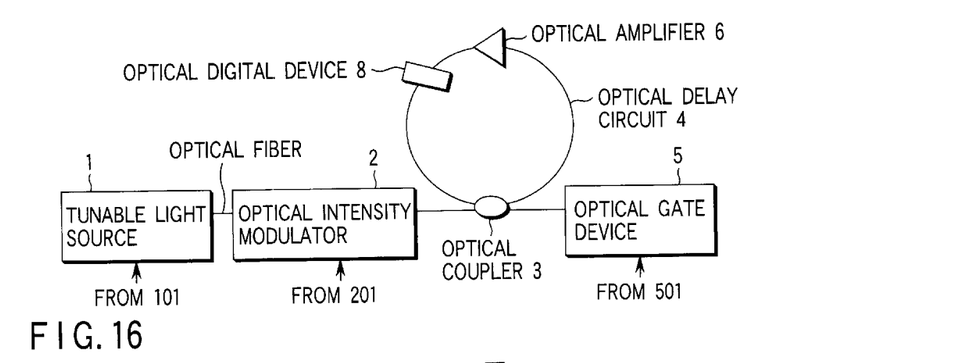
FIG. 16 is a block diagram showing a constitution of a sixth embodiment of the multi-wavelength light source apparatus according to the present invention.

However, in a sixth embodiment, only two optical components of the optical amplifier 6 and optical digital device 8 are disposed in the annular optical delay circuit 4.

Even in the sixth embodiment, for a reason similar to that of the fourth embodiment, the S/N ratio of the digital signal light can be enhanced.

FIG. 16 is a block diagram showing a constitution of the sixth embodiment in which only two optical components of the optical amplifier 6 and optical digital device 8 are disposed in the annular optical delay circuit 4.

The sixth embodiment is similar to the fourth embodiment except that two optical components of the optical amplifier 6 and optical digital device 8 are disposed in the annular optical delay circuit 4, and description thereof is therefore omitted.

(Seventh Embodiment)

Additionally, in the sixth embodiment, only two optical components of the optical amplifier 6 and optical digital device 8 are disposed in the annular optical delay circuit 4.

Figure 17:
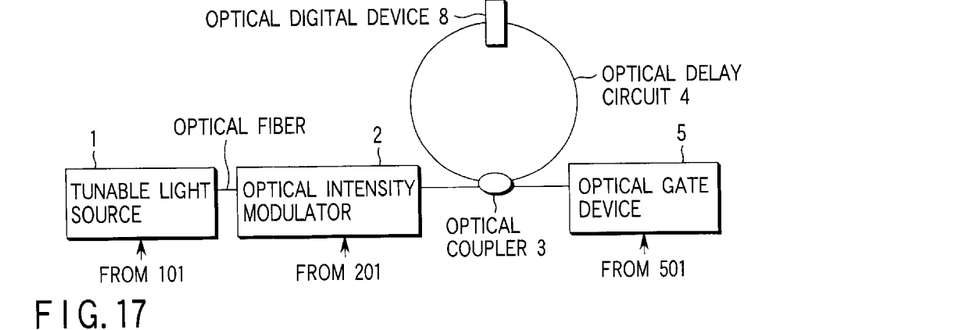
FIG. 17 is a block diagram showing a constitution in which the optical digital device is disposed as only one optical component in an annular optical delay circuit as a seventh embodiment of the multi-wavelength light source apparatus according to the present invention.

However, in a seventh embodiment, the optical digital device 8 is disposed as only one optical component in the annular optical delay circuit 4.

Even in the seventh embodiment, since the S/N ratio of the digital signal light can be enhanced for the following reason, a high-quality multi-wavelength light source can be realized.

FIG. 17 is a block diagram showing a constitution in which the optical digital device 8 is disposed as only one optical component in the annular optical delay circuit 4 according to the seventh embodiment.

The seventh embodiment is similar to the fourth embodiment except that only one optical component of the optical digital device 8 is disposed in the annular optical delay circuit 4, and description thereof is therefore omitted.

In general, an LiNbO$_3$ optical intensity modulator is used as the optical intensity modulator 2 in many cases, a light extinction ratio (optical power ratio of "1" level to "0" level) in the LiNbO$_3$ optical intensity modulator is only about 20 dB, and unnecessary "0" level light which cannot be extinguished in the LiNbO$_3$ optical intensity modulator can be removed by the optical digital device 8.

In this manner, according to the seventh embodiment in which the optical digital device 8 is disposed as only one optical component in the annular optical delay circuit 4, since the S/N ratio of the digital signal light can be enhanced, the high-quality multi-wavelength light source can be realized. (Eighth and Ninth Embodiments) Additionally, in the second embodiment, the optical amplifier 6 is disposed in the annular optical delay circuit 4, and the light intensity of the signal light turning in the annular optical delay circuit 4 is prevented from being lowered by 3 dB for each turn.

However, in this case, the ASE noise outputted from the optical amplifier 6 is accumulated in the optical delay circuit 4, and the S/N ratio of the digital signal light is gradually deteriorated.

Therefore, in the third embodiment, to inhibit the S/N ratio of the digital signal light from being deteriorated, the technique for disposing the optical frequency filter 7 for transmitting only the light whose frequency is equal to that of the packet in the annular optical delay circuit 4 is employed.

Moreover, in the fourth embodiment, to inhibit the S/N ratio of the digital signal light from being deteriorated, it is possible to regenerate the digital signal light, and the technique of disposing the optical digital device 8 having characteristics, such that the ASE with the frequency equal to that of the input signal light at the "0" level is absorbed, in the annular optical delay circuit 4, is employed.

Furthermore, in the sixth embodiment, only two optical components of the optical amplifier 6 and optical digital device 8 are disposed in the annular optical delay circuit 4, and the S/N ratio of the digital signal light can be enhanced for the reason similar to that of the fourth embodiment.

However, in these embodiments, as the optical amplifier 6 disposed in the annular optical delay circuit 4, the semiconductor laser amplifier or the optical fiber amplifier is used.

Here, the semiconductor laser amplifier is used as the optical amplifier 6 in an eighth embodiment.

Moreover, the optical fiber amplifier is used as the optical amplifier 6 in a ninth embodiment.

First, the eighth embodiment in which the semiconductor laser amplifier is used as the optical amplifier 6 will be described.

In order to prevent the S/N ratio of the digital signal light in the packet turning in the annular optical delay circuit 4 as described above from being deteriorated, as shown in FIG. 18, an operation timing of the semiconductor laser amplifier for use as the optical amplifier 6 needs to be controlled.

Figure 18:
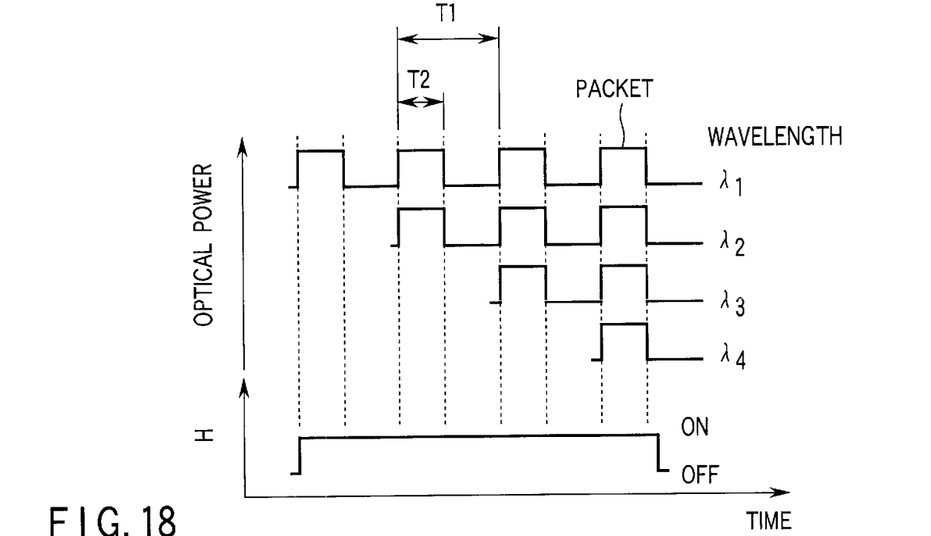
FIG. 18 is a diagram showing a concept of an operation timing of a semiconductor laser amplifier for use as the optical amplifier in an eighth embodiment of the multi-wavelength light source apparatus according to the present invention.

That is, it is necessary to control the semiconductor laser amplifier for use as the optical amplifier 6 generating the ASE noise to turn on in accordance with a timing at which a first packet is incident, and to control the amplifier to turn off after the packets are completely wavelength-division-multiplexed and outputted to the optical gate device 5, so that the ASE noise is inhibited from being superimposed onto the digital signal light.

Figure 19:
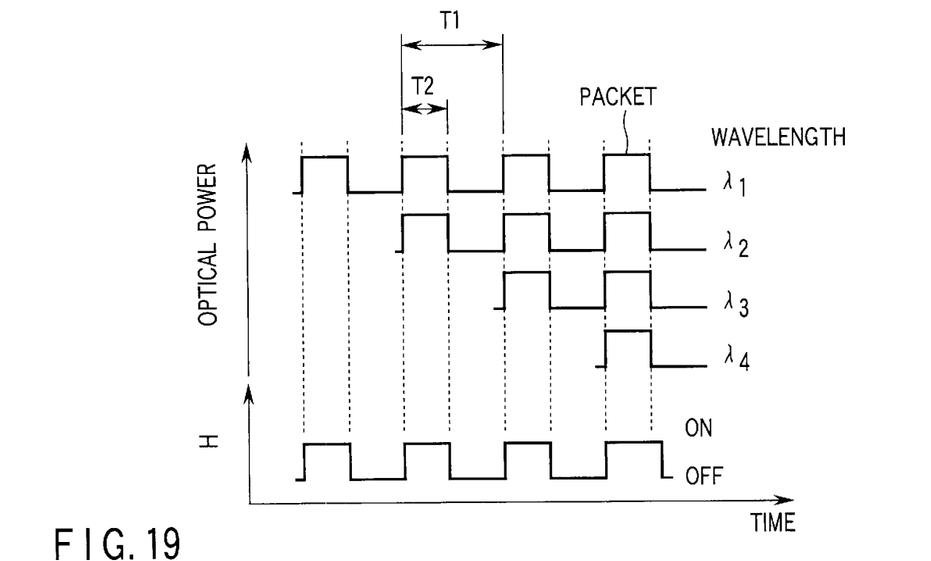
FIG. 19 is a diagram showing a concept of the operation timing of the semiconductor laser amplifier for use as the optical amplifier in the eighth embodiment of the multi-wavelength light source apparatus according to the present invention.

Furthermore, as shown in FIG. 19, the semiconductor laser amplifier used as the optical amplifier 6 is controlled to turn on only when the packet is passed, and influence of the ASE noise can be minimized.

In FIGS. 18 and 19, an ordinate H indicates a value of the current injected to the semiconductor laser amplifier used as the optical amplifier 6.

As shown in FIGS. 18 and 19, a timing for turning on/off the semiconductor laser amplifier used as the optical amplifier 6 needs to be set with a slight margin by considering rise/fall time of the semiconductor laser amplifier and rise/fall time of the driver for controlling the semiconductor laser amplifier.

The ninth embodiment in which the optical fiber amplifier is used as the optical amplifier 6 will next be described.

When the optical fiber amplifier is used as the optical amplifier 6, different from the case of using the semiconductor laser amplifier, the operation of the optical fiber amplifier cannot be turned on/off with the rise/fall time of about 10 ns.

Therefore, when the optical fiber amplifier is used as the optical amplifier 6, it is necessary to also use high-speed optical switches such as an acousto-optic modulator (AOM) and LiNbO$_3$ optical intensity modulator.

Figure 20:
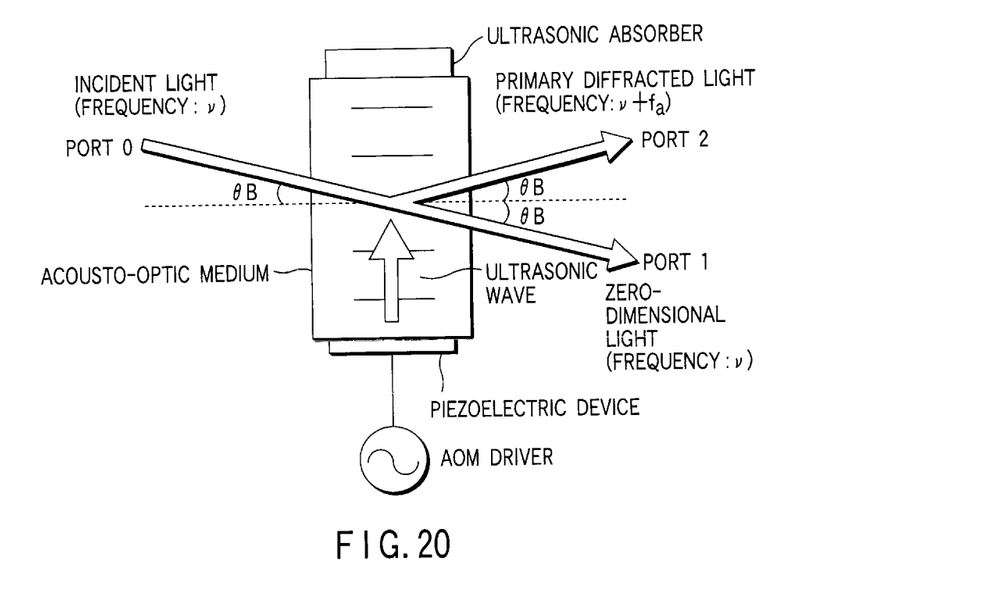
FIG. 20 is a diagram showing a principle constitution of an acousto-optic modulator (AOM) for combined use as a high-speed optical switch when an optical fiber amplifier is used as the optical amplifier in a ninth embodiment of the multi-wavelength light source apparatus according to the present invention.

FIG. 20 is a diagram showing a fundamental constitution of the AOM.

That is, the AOM is an optical modulator constituted by bonding a piezoelectric device to acousto-optic medium such as a single crystal of lead molybdate (PbMoO$_4$). When an ultrasonic wave is generated in the medium by the piezoelectric device, a refractive index fluctuation having a period equal to inverse number of an ultrasonic frequency is generated, and this refractive index fluctuation functions as a diffraction grating with respect to an incident light.

When the light is inputted upon the diffraction grating with an angle $\theta_B$ satisfying the following, Bragg diffraction occurs, and a frequency of a primary diffracted light is shifted by a frequency $f_a$ of the ultrasonic wave from a frequency $v$ of the incident light by Doppler effect and becomes $(v+f_a)$.

$$\sin \theta_B = m\lambda/\Lambda$$

(here, m=1, 2, 3 . . . , $\Lambda$: period of diffraction grating (period of ultrasonic wave), $\theta_B$: shown in FIG. 20, $\lambda$: incident light wavelength)

With the AOM, an extinction ratio (this is represented by a ratio ($P_{ON}$-$P_{OFF}$) (dB) of an optical power $P_{OFF}$ (dBm) obtained in a port 2 when the ultrasonic wave is turned off to an optical power $P_{ON}$ (dBm) obtained in the port 2 when the ultrasonic wave is turned on) is in a range of 40 to 50 dB.

Figure 21:
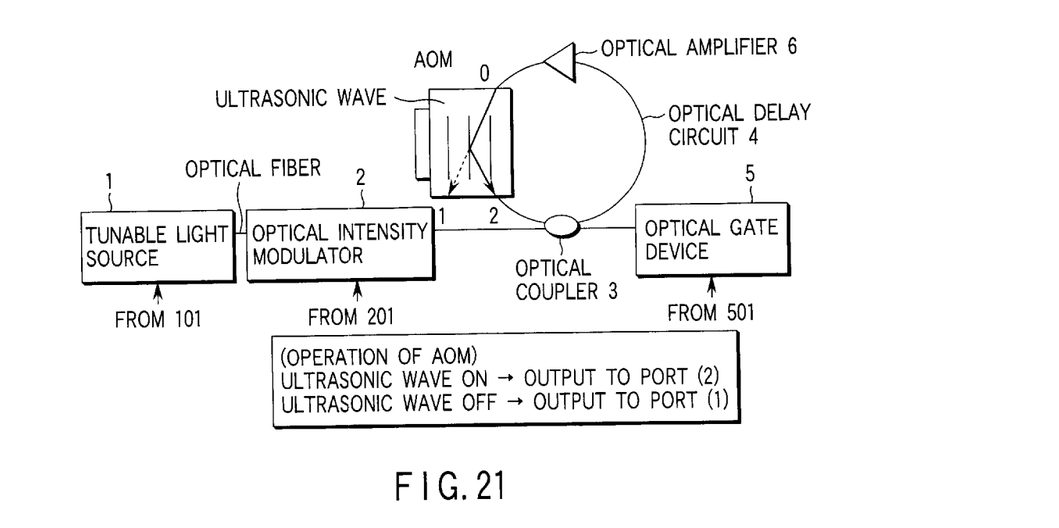
FIG. 21 is a diagram showing a concept of the operation timing when the AOM of FIG. 20 is disposed in the annular optical delay circuit.

Moreover, when the AOM is disposed in the annular optical delay circuit 4, as shown in FIG. 21, ports 0 and 2 are optically connected to the annular optical delay circuit 4, the AOM is turned on (ultrasonic wave is turned on) in synchronization with a packet incident timing, and the AOM is controlled to turn off after the wavelength multiplexing.

Usually, $f_a$ is about 80 MHz, and the input light frequency shifts by 80 MHz for each turn. For example, a total frequency shift amount for 31 turns is 1.24 GHz, and this does not raise any problem when ITU grid interval is 50 GHz or 100 GHz.

Additionally, the rise/fall time in the AOM is 100 ns or less.

Moreover, the LiNbO$_3$ optical intensity modulator is sometimes used instead of the AOM, but only the extinction ratio of about 20 dB is obtained in the LiNbO$_3$ optical intensity modulator, and it can be said that the use of AOM is more effective for inhibiting the ASE in the annular optical delay circuit 4.

Additionally, with the optical fiber amplifier, a life time of upper level is extremely long as 0.2 to 10 ms (with the semiconductor laser amplifier, a life time is of the order of sub-nanoseconds). Therefore, it is unnecessary to turn on/off the AOM every turn of the packet as shown in FIG. 19, and the control may be performed as shown in FIG. 18.

Additionally, for the optical fiber amplifier, the ordinate H in FIGS. 18 and 19 indicates on/off of the AOM drive signal.

Moreover, the combined use of the optical fiber amplifier and AOM is applied to FIGS. 6 and 7.

In FIG. 11, before and after the packet is passed, the light transmittance of the optical digital device 8 disposed in the annular optical delay circuit 4 is at L level, and the ASE noise light is absorbed.

In this case, when the passage of the packet starts, the light transmittance of the optical digital device 8 reaches H level, the opened annular optical delay circuit 4 (because the light transmittance in the optical digital device 8 has been at the L level) is automatically closed, and therefore the high-speed optical switches such as the AOM are unnecessary.

Moreover, when the semiconductor laser amplifier is used as the optical amplifier 6, and the optical digital device 8 is disposed in the annular optical delay circuit 4, the control shown in FIGS. 18 and 19 becomes unnecessary for the similar reason.

As described above, according to the present invention, there is provided the multi-wavelength light source apparatus comprising: the tunable light source; the optical intensity modulator for modulating the amplitude of the light outputted from the tunable light source over the predetermined time; the optical coupler; the annular optical delay circuit, optically connected to the optical coupler, for delaying a part of the modulated signal light outputted from the optical intensity modulator; and the optical gate device for opening the gate at the timing and time width such that each signal light modulated over the predetermined time is included for each wavelength, so that the light source apparatus can simultaneously output the multi-wavelength packets formed of the independent digital signal lights, without disposing the components for the respective multiplexed wavelengths as in the conventional apparatus.

Furthermore, the optical amplifier, optical frequency filter, and optical digital device are disposed in the annular optical delay circuit. Therefore, even when the wavelength multiplex number is very large as 100 or more, the S/N ratio of the digital signal lights constituting the packet can be held to be high.

Moreover, when the optical bistable device provided with all functions of the optical amplifier, optical frequency filter, and optical digital device is used instead of these components, the number of optical components can be reduced, and further miniaturization and low cost can be realized.

The multi-wavelength light source apparatus of the present invention can be applied to a light source section in an apparatus for checking an operation of an optical router which constitutes a core of a packet data transmission system into which mainly data and voice service can be incorporated, and the apparatus can be small-sized and inexpensive as compared with the conventional apparatus.

Therefore, as described above in detail, according to the present invention, for shipping inspection of the optical router expected to constitute the core of the next-generation network or for inspection during construction of the network, the annular optical delay circuit is used in order to easily correspond to an increase of the wavelength multiplex number, and therefore the small-sized and inexpensive multi-wavelength light source apparatus can be realized.

What is claimed is:

1. A multi-wavelength light source apparatus comprising:
    a tunable light source for successively changing and outputting a plurality of output lights different in wavelength from one another;
    an optical intensity modulator for modulating an amplitude of the output light outputted from said tunable light source over a predetermined time and outputting the modulated signal light;
    an optical coupler, optically connected to said optical intensity modulator, for receiving the output light outputted from said optical intensity modulator;
    an annular optical delay circuit, optically connected to said optical coupler, for delaying a part of the output light outputted from said optical intensity modulator over a time longer than said predetermined time; and
    an optical gate device, optically connected to said optical coupler, for receiving the output light outputted from said optical intensity modulator and the light which passed said annular optical delay circuit, to open a gate at a timing and a time width such that all of the signal light amplitude-modulated over said predetermined time is included one by one for each of said plurality of wavelengths.

2. The multi-wavelength light source apparatus according to claim 1, comprising an optical amplifier, optically connected into said annular optical delay circuit, for amplifying a light intensity of the light inputted to said annular optical delay circuit.

3. The multi-wavelength light source apparatus according to claim 2, comprising an optical frequency filter, optically connected into said annular optical delay circuit, for passing only the plurality of lights different in wavelength from one another outputted from said tunable light source out of lights inputted to the annular optical delay circuit.

4. The multi-wavelength light source apparatus according to claim 1, comprising an optical digital device, optically connected into said annular optical delay circuit and provided with characteristics such that light transmittance is high when the light intensity of the light inputted to said annular optical delay circuit exceeds a predetermined threshold value, and the light transmittance is low when the light intensity indicates said threshold value or less.

5. The multi-wavelength light source apparatus according to claim 2 wherein said optical amplifier is an optical bistable device for selectively amplifying only the plurality of lights different in wavelength from one another outputted by said tunable light source and amplifying an alternating-current component of said modulated signal light at an amplification factor higher than that of a direct-current component.

6. The multi-wavelength light source apparatus according to claim 1, comprising: an optical amplifier, optically connected into said annular optical delay circuit, for amplifying a light intensity of the light inputted to said annular optical delay circuit; and an optical digital device, optically connected into said annular optical delay circuit and provided with characteristics such that light transmittance is high when the light intensity of the light inputted to said annular optical delay circuit exceeds a predetermined threshold value, and the light transmittance is low when the light intensity indicates said threshold value or less.

7. The multi-wavelength light source apparatus according to claim 3 wherein said optical frequency filter is an asymmetric Mach-Zehnder interferometer.

8. The multi-wavelength light source apparatus according to claim 3 wherein said optical frequency filter is a Fabry-Perot resonator.

9. The multi-wavelength light source apparatus according to claim 1, comprising:
   a tunable light source driver for driving said tunable light source in a predetermined state;
   an optical intensity modulator driver for driving said optical intensity modulator in the predetermined state; and
   an optical gate device driver for driving said optical gate device in the predetermined state.

10. The multi-wavelength light source apparatus according to claim 9, comprising a controller for controlling said tunable light source driver, said optical intensity modulator driver, and said optical gate device driver in the respective predetermined states.

11. The multi-wavelength light source apparatus according to claim 3, comprising an optical digital device optically connected into said annular optical delay circuit and provided with characteristics such that light transmittance is high when the light intensity of the light inputted to said annular optical delay circuit exceeds a predetermined threshold value, and the light transmittance is low when the light intensity indicates said threshold value or less.

* * * * *